Patented Feb. 2, 1943

2,310,045

UNITED STATES PATENT OFFICE 2,310,045

GUANYLUREA SALTS

Jack T. Thurston, Stamford, and Robert C. Swain, Riverside, Conn., assignors to American Cyanamid Company, New York, N. Y., a corporation of Maine No Drawing. Application December 13, 1940, Serial No. 369,952

5 Claims. (Cl. 260—501)

This invention relates to guanylurea salts of organic acids and their methods of preparation.

It is the principal object of this invention to obtain such salts of the general formula:

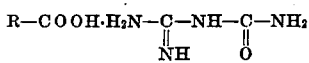

wherein R is an alkyl having 7 or more carbon atoms, an aryl, heterocyclic or cycloaliphatic radical. Guanylurea salts are prepared in accordance with this invention by reacting the corresponding acid R—COOH with guanylurea.

The compounds included in this invention are highly soluble in water and hence to facilitate their separation from the reaction medium the reaction is preferably carried out in the absence of water or with as little water as possible present. Also, the neutralization of the acid by guanylurea is usually effected at a moderate temperature maintained over as short a time interval as is conducive to completion of the desired reaction.

To this end, the following examples are merely illustrative embodiments of the invention.

Example I.—Guanylurea benzoate

To 20.4 g. of guanylurea dissolved in 150 cc. of hot denatured alcohol was added 24.4 g. of benzoic acid dissolved in 100 cc. of hot denatured ethyl alcohol. A precipitate was formed almost immediately. This reaction mixture was heated to boiling and stirred for 2 or 3 minutes with the addition of more alcohol to obtain a more homogeneous solution. This solution was then cooled in ice water whereupon needle-like crystals were formed. The precipitate was filtered and dried on a steam bath yielding 36 g. of the desired guanylurea benzoate having a M. P. of 175 to 176° C.

Example II.—Guanylurea phthalate

To 30.6 g. of guanylurea dissolved in 150 cc. of hot denatured alcohol was added 24.9 g. of phthalic acid dissolved in 150 cc. of hot denatured ethyl alcohol. The reaction was exothermic and a precipitate formed. Upon partial cooling, a gummy deposit formed which was removed by filtration. On standing overnight, the filtrate deposited needle-like crystals of the desired guanylurea phthalate having a M. P. of 135–137° C.

Example III.—Guanylurea stearate

To 30 g. of guanylurea dissolved in 150 cc. of hot denatured ethyl alcohol was added 75 g. of stearic acid dissolved in 150 cc. of hot denatured ethyl alcohol. The reaction product did not crystallize from the alcohol solution readily and hence it was necessary to concentrate the solution to smaller volume whereupon a precipitate formed. After filtering and recrystallizing from hot dioxane, the desired guanylurea stearate having a M. P. of 124–130° C. was obtained.

Example IV.—Guanylurea 2-ethyl-hexanoate

To 30 g. of guanylurea dissolved in 150 cc. of hot denatured ethyl alcohol was added 43 g. of 2-ethyl-hexanoic acid dissolved in 150 cc. of hot denatured ethyl alcohol. The reaction product did not crystallize from the alcohol solution readily and hence it was necessary to concentrate the solution to smaller volume whereupon a precipitate formed. After filtering and recrystallizing this precipitate from hot dioxane the desired guanylurea 2-ethyl-hexanoate having a M. P. of 139–141° C. was obtained.

Example V.—Guanylurea salt of naphthenic acid

To 11 g. of guanylurea dissolved in denatured ethyl alcohol was added 24 g. of mixed naphthenic acids having an average molecular weight of 238. The reaction mixture was heated with constant stirring to about 70° C. with the addition of more alcohol in order to obtain a homogeneous solution at this temperature. After filtering and concentrating the filtrate to about one-fourth its original volume it was diluted with dioxane. The guanylurea salt of the naphthenic acids formed as a crystalline mass which was collected on a filter paper. The colorless crystals melted at about 90 to 100° C.

Example VI.—Guanylurea salt of 2-phenyl-cinchoninic acid

To 11 g. of guanylurea dissolved in about 100 cc. of warm methyl alcohol was added a methyl alcohol solution containing 25 g. of 2-phenylcinchoninic acid. Additional alcohol was added in order to obtain a homogeneous solution at a temperature of 60° C. After filtering, the filtrate was cooled in an ice bath whereupon colorless crystals formed, and were collected on a filter paper. They melted at about 275° C.

Various other organic acids in addition to those specifically given in the above examples may be used. The following are cited as yielding more useful products of guanylurea salts: caprylic, capric, lauric, myristic, palmitic, etc., acids; the dibasic acids such as malonic, succinic, glutaric, adipic, and sebacic acids; the more complex acids containing aryl, heterocyclic and cycloaliphatic radicals, such as naphthoic, anthracene-2-carboxylic, hexahydrobenzoic cyclohexylacetic acid, cyclohexylidene acetic acid, cyclopentyl acetic acid, and cyclopentane carboxylic acid, among others.

Although methyl alcohol and denatured ethyl alcohol have been given as the principal reaction media in the above examples, it is also possible to use various other solvents as media for the preparation of the compounds of this invention, namely propanol, isopropanol, butanol, etc., and dioxane among still others.

These salts find favorable use as latent catalysts for the aminoformaldehyde types of resins. This is due to their chemical structure and unstable nature. When incorporated in a molding powder they do not exhibit strongly acidic properties until the molding powder has had ample opportunity to flow. At this optimum moment, these salts combine with the formaldehyde or other aldehyde present and liberate free acid. In this manner they act as highly satisfactory latent catalysts.

The change in pH of neutral formaldehyde solutions of these salts after heating is shown in the following examples:

|  | Per cent concentration | pH in formalin | |
|---|---|---|---|
|  |  | Before | After boiling 30 min. |
| Guanylurea benzoate | 5.0 | 5.9 | 4.6 |
| Guanylurea phthalate | 2.5 | 6.2 | 4.6 |

The products of this invention find additional use as intermediates for the preparation of guanides, compounds containing a triazine nucleus, by the cyclicizing of the guanylurea salts by means of a simple dehydration step. Such compounds make highly desirable textile finishing materials and waterproofing materials for both textiles and paper.

In addition to their buffering properties in resin chemistry, guanylurea salts of organic acids find further use as sudsing and wetting agents, in cleansers and as ingredients for textile and thread lubricants. These compounds are particularly useful for preparing soaps which are to be incorporated into mineral lubricating oils and greases.

It is to be understood that the processes and compounds herein described are merely illustrative and that the invention is not limited thereto but is to be broadly construed within the scope of the appended claims.

We claim:

1. The process of preparing guanylurea salts of organic acids having the general formula:

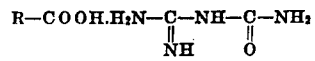

where R is a member of the group consisting of an alkyl having at least 7 carbon atoms, an aryl and a cycloaliphatic radical, which comprises neutralizing the corresponding acid RCOOH with guanylurea.

2. A guanylurea salt having the following general formula:

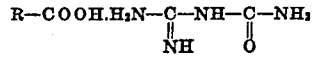

where R is a member of the group consisting of an alkyl having at least 7 carbon atoms, an aryl and a cycloaliphatic radical.

3. Guanylurea 2-ethylhexanoate.

4. As new compounds, the guanylurea salts of mixed naphthenic acids.

5. Guanylurea benzoate.

JACK T. THURSTON.
ROBERT C. SWAIN.